(12) United States Patent
Ng et al.

(10) Patent No.: US 7,471,071 B2
(45) Date of Patent: Dec. 30, 2008

(54) EXTENDING THE VOLTAGE OPERATING RANGE OF BOOST REGULATORS

(75) Inventors: Wendy Ng, San Jose, CA (US); Charles Vinn, Milpitas, CA (US); Ramesh Selvaraj, Cupertino, CA (US)

(73) Assignee: Micrel, Inc., San Jose, CA (US)

( * ) Notice: Subject to any disclaimer, the term of this patent is extended or adjusted under 35 U.S.C. 154(b) by 235 days.

(21) Appl. No.: 11/564,205

(22) Filed: Nov. 28, 2006

(65) Prior Publication Data
US 2008/0122417 A1    May 29, 2008

(51) Int. Cl.
*G05F 1/40* (2006.01)
*G05F 1/10* (2006.01)

(52) U.S. Cl. .................................... 323/273; 323/222

(58) Field of Classification Search ......... 323/222–226, 323/266, 268, 270, 271, 273, 275–277, 280–285; 363/59, 60
See application file for complete search history.

(56) References Cited

U.S. PATENT DOCUMENTS 5,808,884 A * 9/1998 Teggatz et al. .............. 363/98
6,897,637 B2 * 5/2005 Chen et al. .................. 323/274
6,937,487 B1 * 8/2005 Bron .......................... 363/60
7,199,565 B1 * 4/2007 Demolli ...................... 323/273
7,317,302 B1 * 1/2008 Collins ....................... 323/222
7,394,231 B2 * 7/2008 Flatness et al. ............. 323/259

* cited by examiner

*Primary Examiner*—Matthew V Nguyen
(74) *Attorney, Agent, or Firm*—Patent Law Group LLP; Brian D. Ogonowsky

(57) ABSTRACT

One embodiment of the invention is a hybrid boost regulator that includes a conventional boost regulator chip that operates when its input voltage is above 2.5 volts and a pre-boost circuit that operates when its input voltage is above 1 volt. A single 1.5 volt battery may be used to power the hybrid boost regulator. The pre-boost circuit is connected to the voltage input terminal of the boost regulator chip. The pre-boost circuit boosts the battery voltage (e.g., 1.5v) at an output terminal of the hybrid boost regulator to approximately the minimum operating voltage (e.g., 2.5v) of the boost regulator chip. Since this pre-boosted voltage is applied to the voltage input terminal of the boost regulator chip, the boost regulator chip will become operational when the ramping output voltage of the hybrid boost regulator exceeds about 2.5 volts. Once the boost regulator chip is operational, the pre-boost circuit is then turned off, and the boost regulator chip runs off the 1.5 volt power supply to ramp up the output voltage to the full regulated voltage.

24 Claims, 5 Drawing Sheets

EXTENDING THE VOLTAGE OPERATING RANGE OF BOOST REGULATORS

FIELD OF THE INVENTION

This invention is related to boost regulators and, in particular, to a method to extend the operating voltage of typical boost regulators down to approximately 1 volt.

BACKGROUND

A boost regulator receives a voltage from an unregulated voltage source, such as a bank of batteries, and generates a higher constant voltage at an output terminal. Relatively high voltages are needed for devices such as digital cameras and display drivers.

The control portion of a boost regulator is typically implemented as an integrated circuit. The boost regulator switches a switching transistor at a certain frequency and duty cycle to alternately charge and discharge an inductor having one end connected to a power supply voltage and its other end connected to the transistor. The transistor is connected between ground and the inductor. An output filter and diode are connected to the inductor so that, when the transistor is off, the inductor incrementally charges an output filter capacitor. The amount of charge per cycle equals the current needed by the load, connected to the output filter, so that the regulator supplies current to the load at a constant voltage. A feedback circuit varies the duty cycle to keep the output voltage at the desired regulated voltage.

The typical boost regulator chip requires an input voltage of at least 2.5 volts for operating its control circuitry. Since most batteries used in portable electronic devices housing a boost regulator are 1.5 volts, such devices require at least two batteries in order to supply sufficient operating voltage to the boost regulator. Further, as the batteries age and lose energy, their output voltage will drop so that the batteries need replacing when their combined voltage is less than 2.5 volts.

What is desirable is a boost regulator circuit that can operate with battery voltages of 1.5 volts or less so that only one battery is needed to operate the boost regulator.

SUMMARY

One embodiment of the invention is a hybrid boost regulator that includes a conventional boost regulator chip that operates when its input voltage is above 2.5 volts and a pre-boost circuit that operates when its input voltage is above 1 volt. A single 1.5 volt battery may be used to power the hybrid boost regulator.

In one embodiment of the invention, the pre-boost circuit is connected to the voltage input terminal of a conventional boost regulator chip. In one embodiment, the conventional boost converter chip is a current mode PWM controller; however, any other type of conventional boost converter chip can be used. It is assumed that the minimum operating voltage of the conventional boost regulator chip is 2.5 volts.

The pre-boost circuit includes an oscillator that can operate with a voltage down to 1 volt. When a battery voltage of between 1-2.5 volts is connected to the hybrid boost regulator, the oscillator begins switching a pre-boost circuit transistor. In one embodiment, the pre-boost transistor is a low current bipolar transistor. The pre-boost circuit transistor has its collector connected to the switch output node of the boost regulator chip so that the pre-boost transistor and the main switching transistor are in parallel. Both transistors are connected to the boosted voltage end of the output inductor.

Due to the charging and discharging of the inductor by the switching of the bipolar transistor, the output of the hybrid boost regulator ramps up. The pre-boost circuit includes a linear regulator, also referred to as a low dropout (LDO) regulator, connected between the boosted output voltage terminal and the voltage input terminal of the conventional boost regulator chip. The LDO regulator outputs a constant voltage of, for example, 2.5 volts, which is in the range of operating voltages for the boost regulator chip. Accordingly, when the pre-boost circuit has generated a voltage at the output terminal greater than 2.5 volts, the voltage will be high enough for the LDO regulator to apply 2.5 volts to the boost regulator chip, allowing the boost regulator chip to begin operating. At this point, the boost regulator chip takes over the job of ramping up the output voltage until the output voltage has reached the desired regulated voltage. The boost regulator chip continues to operate off the boosted output voltage that has been regulated by the external LDO regulator. If the boost regulator chip has an internal LDO regulator, the external LDO regulator of the pre-boost circuit may be deleted.

The pre-boost circuit is disabled once it is detected that the boost regulator chip is operating. One way of sensing that the switching transistor of the boost regulator chip is switching is to detect whether the current through the switching transistor has exceeded a minimum threshold. This may be done by monitoring a current sense terminal of the boost regulator chip. When the current has exceeded a minimum level, as determined by a comparator, the oscillator in the pre-boost circuit is shut down.

With the combination of the pre-boost circuit and the boost regulator chip, the hybrid boost converter operates with battery voltages as low as 1 volts, allowing the electronic device to operate with only one battery. The hybrid boost converter also allows the device to be smaller, lighter, and have an extended operating time. The entire hybrid boost regulator, except for the output filter, may be formed as a single integrated circuit.

DETAILED DESCRIPTION

Figure 1:
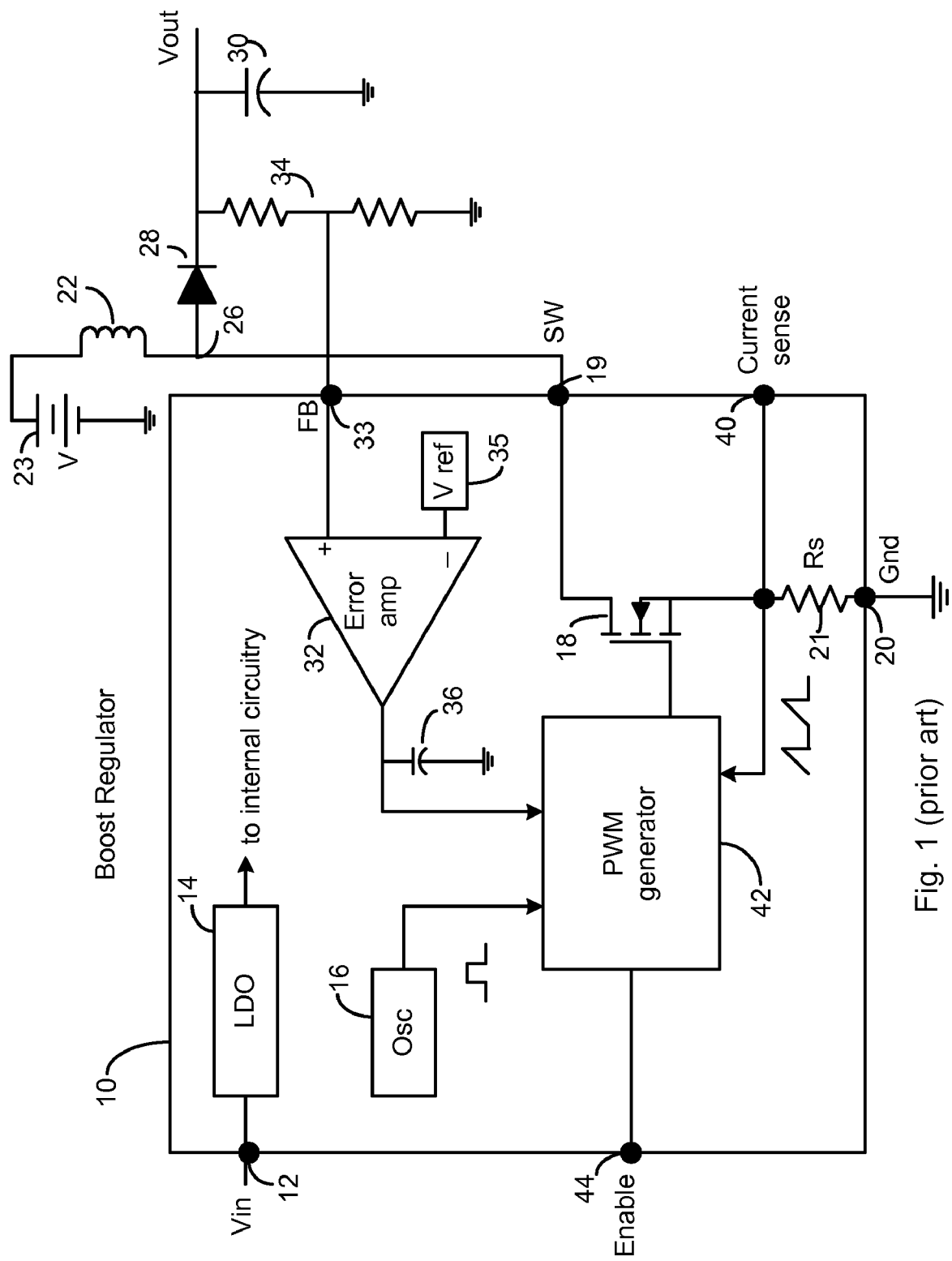
FIG. 1 illustrates a prior art current mode PWM boost converter chip, requiring a power supply voltage of at least 2.5 volts, that may be used in the hybrid boost regulator of the present invention.

In one example of the invention, the conventional boost regulator chip 10 of FIG. 1 is used. An input voltage (Vin) for powering the chip is connected to pin 12. Pin 12 is typically connected to a battery terminal. In one embodiment, the chip includes an LDO regulator 14 connected to the pin 12 for generating a certain fixed voltage (e.g., 2.5 volts) for operating the circuitry in chip 10.

When Vin is sufficiently high, the oscillator 16 will begin operating and initiate the switching of transistor 18 (a MOSFET) at the oscillator frequency (e.g., 1 MHz). The transistor 18 is connected between a switch pin 19 and a ground pin 20 through a low value sense resistor 21. When the transistor 18 is conducting, inductor 22 is charged by being connected between the voltage supply 23 and ground. Voltage supply 23 may be the same battery voltage applied to Vin pin 12.

When the transistor 18 is turned off, the inductor 22 reverses the polarity of the voltage at node 26. This "high" voltage forward biases diode 28 and charges output capacitor 30 by an incremental amount. The switching continues to incrementally charge up the output capacitor 30. Ultimately, the output voltage Vout will be at the desired regulated level after the initial ramping up when power is first connected. A load is connected to the Vout terminal.

An error amplifier 32 (a differential amplifier) is part of a feedback circuit. Amplifier 32 receives at feedback pin 33 a divided down output voltage from the resistor divider 34 and also receives a fixed reference voltage 35. The output of amplifier 32 is referred to as an error voltage. A compensation capacitor 36 (which is typically external) filters the error voltage. The voltage at capacitor 36 determines the duty cycle of transistor 18. The feedback circuitry adjusts the duty cycle so that the feedback voltage at pin 33 matches the reference voltage 35.

The low value sense resistor 21 (either internal to the chip or external) drops a voltage proportional to the current through transistor 18. The voltage at the current sense pin 40 is a ramping voltage proportional to the current. At the start of a switching cycle, transistor 18 turns on. When the current ramp crosses the error voltage, the transistor 18 turns off for the remainder of the cycle. In this manner, the duty cycle is controlled to maintain the output voltage Vout at a regulated voltage. A PWM generator 42 is a comparator that senses the crossing of the error voltage by the current ramp to turn off transistor 18 and gets reset when the oscillator issues a pulse.

An enable pin 44 receives a logic high voltage (e.g., >1.5v) to enable the internal circuitry and receives a logic low voltage (e.g., <0.5v) to disable the internal circuitry.

The boost regulator 10 of FIG. 1 requires a minimum Vin at pin 12 to operate, which is typically specified by the manufacturer.

Figure 2:
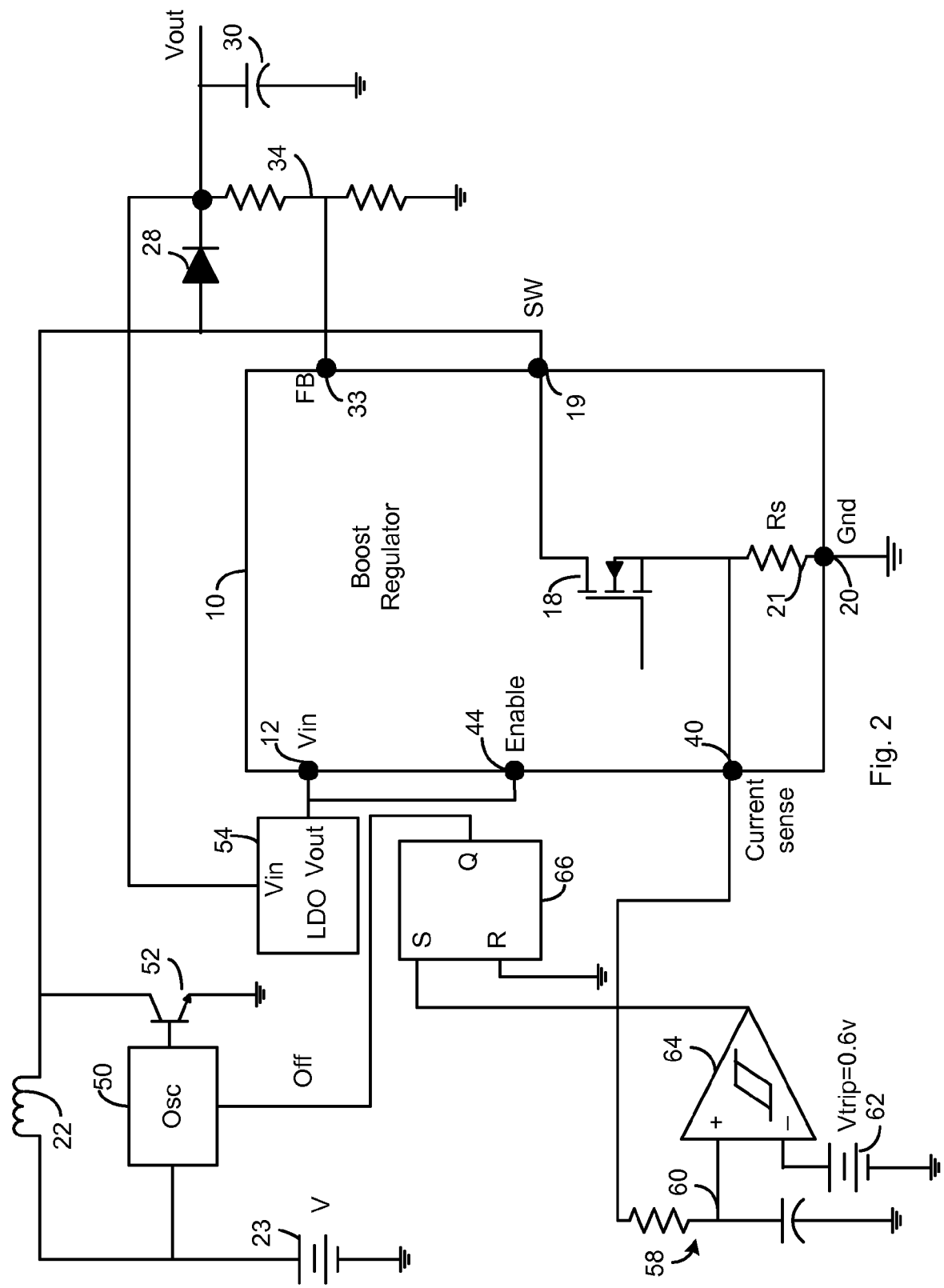
FIG. 2 illustrates the pre-boost circuit connected to the boost converter chip of FIG. 1 to enable the hybrid boost converter to operate with battery voltages down to 1 volt.

FIG. 2 illustrates a hybrid boost regulator that includes a pre-boost circuit connected to the boost regulator 10 of FIG. 1 to enable a battery voltage of only 1 volt to properly operate boost regulator 10. The entire circuit of FIG. 2 will be referred to as a hybrid boost regulator, and the chip 10 will sometimes be referred to as the main boost regulator 10 to better distinguish it from the pre-boost circuit. Elements that are identical to those in FIG. 1 are labeled with the same numerals.

In FIG. 2, the voltage supply 23 is assumed to be a 1.5 volt battery that has just been inserted into a battery holder in an electronic device, such as a digital camera, a display, a cell phone, or any other device. An oscillator 50 receives the 1.5 volt power and begins generating pulses at its oscillation frequency, such as 1 MHz. Oscillator 50 may be a ring oscillator (a ring of odd number NOT gates or inverters), a delay oscillator, an RC oscillator, or any other type of well known oscillator. Conventional oscillators of this type satisfactorily operate at a minimum of 1 volt. The oscillator frequency need not be precise since the oscillator 50 operates for only a short time, and the frequency does not affect the operation of the pre-boost circuit.

The oscillator 50 pulses turn on and off a small bipolar transistor 52 connected between the boosted voltage side of inductor 22 and ground. Any type of small transistor may be used, such as a MOSFET. The transistor 52 can only conduct a relatively small current, and a suitable size of transistor 52 must be determined based on the requirements of the overall regulator. Setting the frequency of oscillator 50 to be high, such as 1 MHz, allows the transistor 52 to be small since it will conduct a small current each cycle. The transistor 52 only needs a base voltage of approximately 0.7 volts to turn on.

When transistor 52 is on, inductor 22 will charge since the inductor 22 is connected between the voltage supply 23 and ground. When the transistor 52 is turned off, the inductor voltage at node 26 will rise until diode 28 is forward biased. The inductor energy will charge capacitor 30 an incremental amount to slightly ramp up the output voltage Vout. The repeated switching of transistor 52 creates a triangular current waveform through inductor 22.

The boosted output voltage Vout is fed to the input of an LDO regulator 54, and the output of LDO regulator 54 is connected to the Vin pin 12 of the main boost regulator chip 10. The LDO regulator is set to output a regulated 2.5 volts when its input is any voltage above 2.5 volts. The LDO regulator 54 is simply a series transistor whose conductivity is controlled by a feedback loop that maintains the output at 2.5 volts. The LDO regulator 54 can be replaced with a zener diode or deleted altogether if chip 10 contains an internal LDO regulator.

The output of LDO regulator 54 is also connected to the enable pin 44 of chip 10. It is assumed an enable voltage of greater than 1.5 volts enables chip 10. Chip 10, however, will not operate until its input voltage is 2.5 volts or more.

After a sufficient number of switching cycles of transistor 52, Vout will reach approximately 2.5 volts, and LDO regulator 54 will supply 2.5 volts to the Vin pin 12 of chip 10. At this point, chip 10 begins switching transistor 18 to take over the ramping up of the output voltage Vout. The pre-boost circuit is now no longer needed.

One way of disabling the pre-boost circuit when chip 10 has turned on is to detect current flowing through the transistor 18. This is convenient if the chip 10 has a current sense pin 40. Many other methods can be used, such a by sensing the voltage across an external sense resistor or sensing that Vout or Vin is above a certain threshold.

The voltage across the sense resistor 21 is applied to an RC filter 58 to generate a DC voltage at node 60 that corresponds to the average transistor 18 current. In the particular embodiment of FIG. 2, the voltage at node 60 that indicates that transistor 18 is adequately switching is determined to be 0.6 volts. A reference voltage 62 of 0.6 volts and the voltage at node 60 are applied to a hysteresis comparator 64. When the comparator 64 trips (its output goes high), the chip 10 is determined to be fully operational.

The high output of comparator 64 sets an RS flip flop, causing its Q output to go high. The high Q output shuts off oscillator 50 to disable the pre-boost circuit, and the chip 10 is now fully operational while operating off of the 1.5 voltage battery supply 23. The chip 10 then operates to generate the regulated voltage as described with respect to FIG. 1.

The high Q output may also disable other circuitry in the pre-boost circuit to save power.

Figure 3:
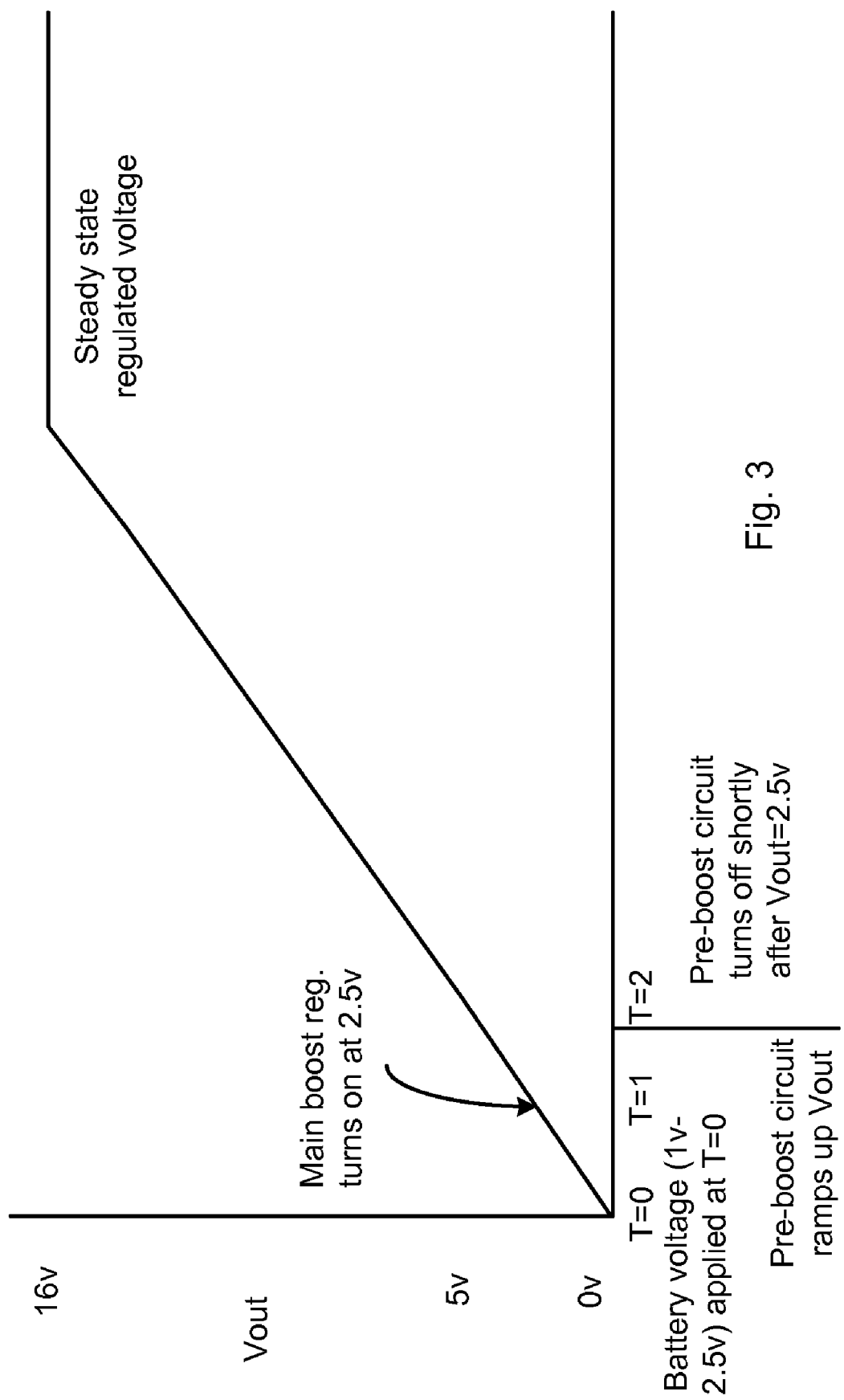
FIG. 3 is a graph showing the transition between the pre-boost circuit operation and the boost regulator chip operation.

FIG. 3 illustrates the output voltage Vout vs. time and how the chip 10 takes over from the pre-boost circuit between time T=1 and T=2. The graph will be described with respect to the flow chart of FIG. 4.

Figure 4:
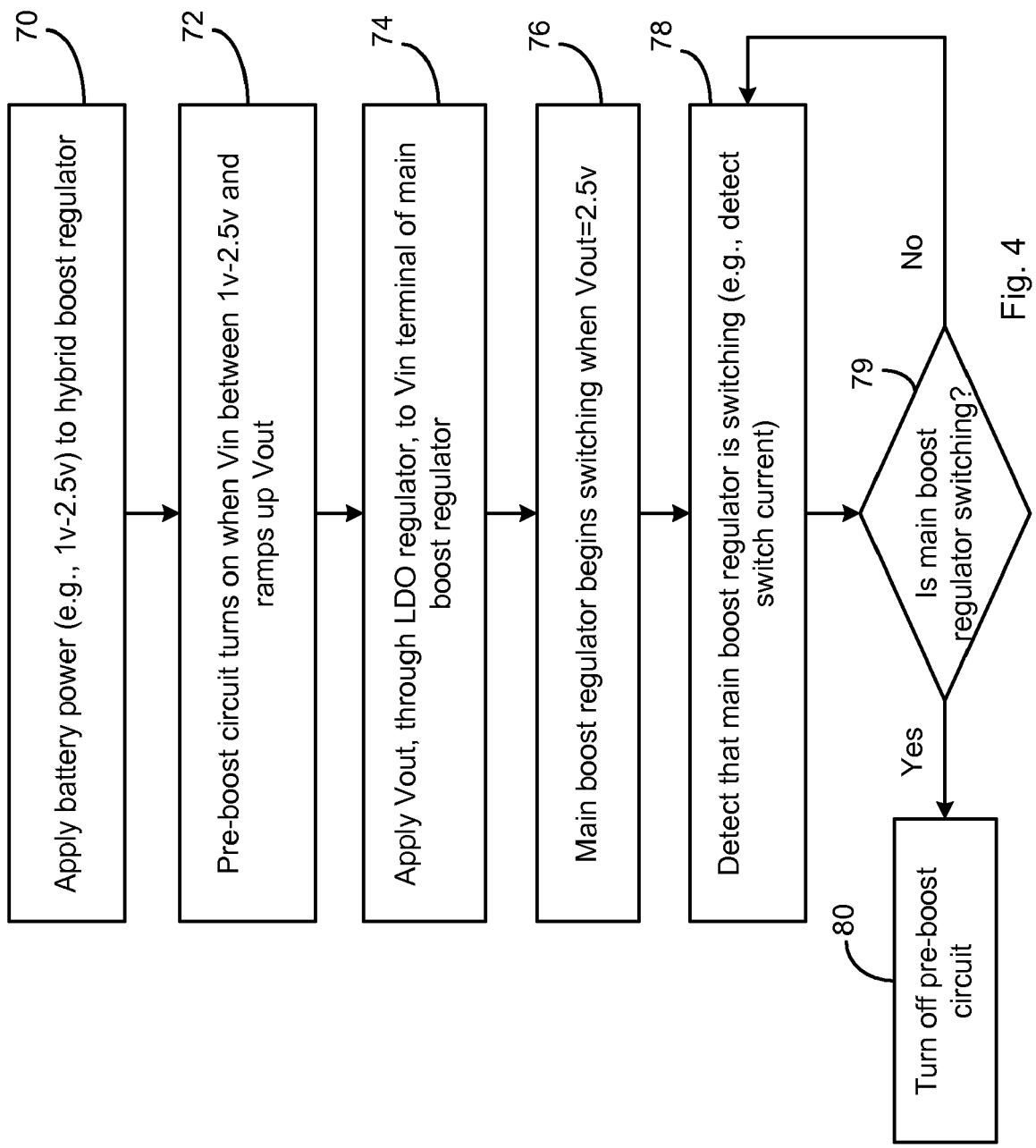
FIG. 4 is a flow chart of various steps in the operation of the hybrid boost regulator of FIG. 2.

At T=0, a battery voltage (voltage supply 23) of between 1-2.5 volts is applied to the hybrid boost regulator (step 70 of FIG. 4). From T=0 to T=1, the pre-boost circuit ramps up Vout and the chip 10 is off (step 72). Vout is applied to an input of the LDO regulator 54, where the LDO regulator 54 is set to output a regulated voltage of 2.5 volts to the Vin terminal of chip 10 once Vout reaches 2.5 volts (step 74). At a Vout of approximately 2.5 volts, the chip 10 is enabled and operating at the same time as the pre-boost circuit (step 76). The current capability of the transistor 18 (e.g., 1.7 Amps) is much greater than the current capability of the pre-boost circuit transistor 52 (e.g., 10 mA), so the ramping of the output voltage Vout after T=1 is primarily a result of the transistor 18 switching, and the ramping may be at a steeper slope. Any non-synchronous switching of transistors 52 and 18 is tolerable during this overlap time since the transistor 18 dominates. At T=2, the pre-boost circuit shuts off due to the detection of adequate current being conducted by the transistor 18 (steps 78, 79, and 80), and chip 10 ultimately regulates the output voltage to, for example, 16 volts.

In summary, the pre-boost circuit boosts the low battery voltage to approximately the minimum operating voltage of the main boost regulator; this pre-boosted voltage is applied to the input voltage terminal of the main boost regulator until the main boost regulator is operational; and the pre-boost circuit is then turned off.

Figure 5:
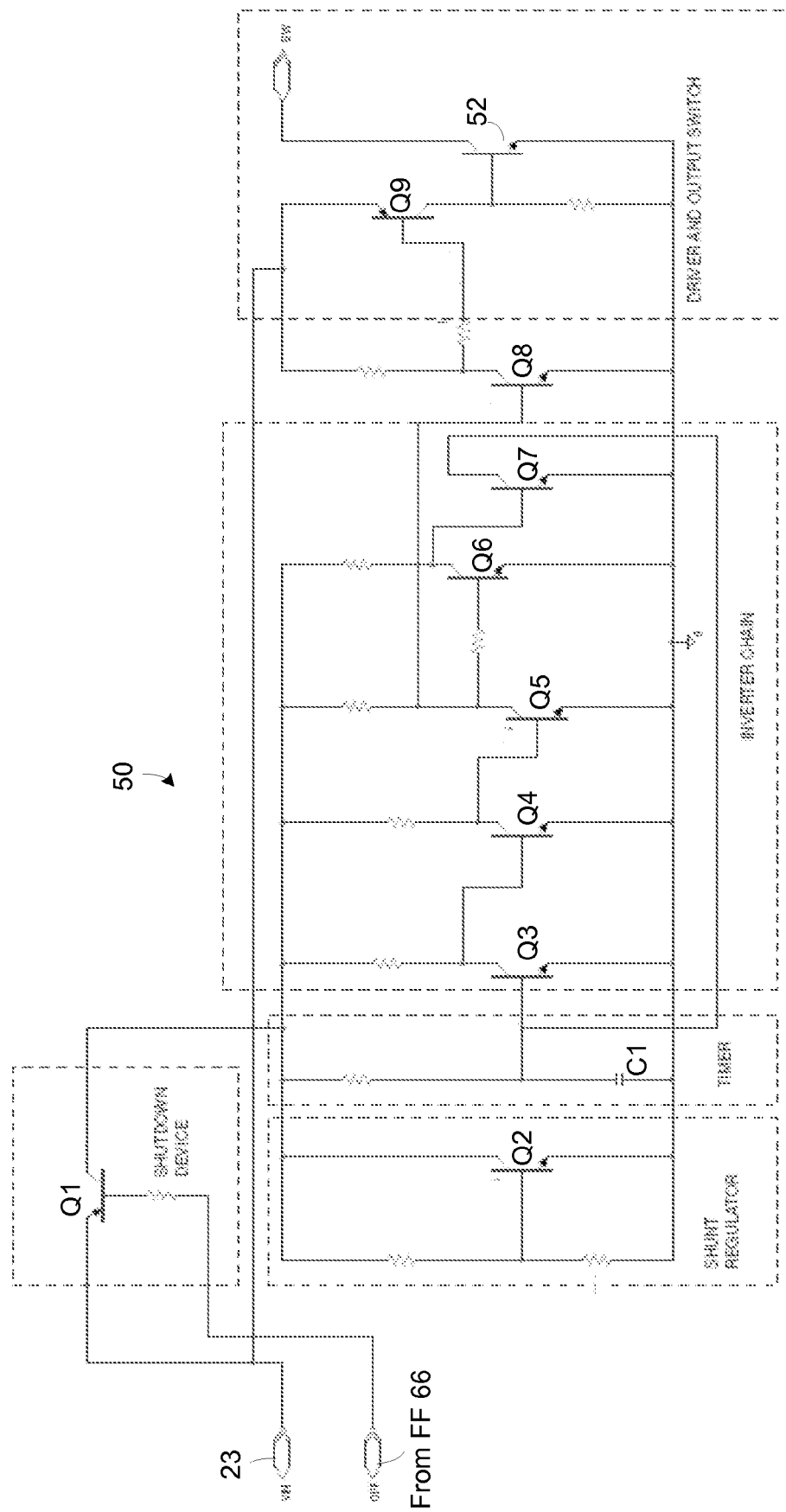
FIG. 5 is a transistor level schematic of one embodiment of the oscillator in FIG. 2.

Although many types of oscillators 50 in FIG. 2 may be used, FIG. 5 illustrates a preferred oscillator design, which is an inverter chain or ring.

A low output of flip flop 66 in FIG. 2 causes a PNP transistor Q1 to conduct to couple the supply voltage 23 to the input of the oscillator 50. There may be a pull down resistor (coupled to ground) at the output of the flip flop 66 so that the flip flop 66 does not need to be energized to generate a low output. The voltage coupled to the oscillator 50 is regulated by shunt transistor Q2, having a base voltage set by a resistor divider. The transistor Q2 maintains the divided voltage at about 0.7 volts. The resistor values are selected so that a suitable maximum voltage is applied to the oscillator 50 such as 1-1.5 volts.

At the start of the oscillator cycle, the timing capacitor C1 is charging, transistor Q3 is off, transistor Q4 is on, transistor Q5 is off, transistor Q6 is on, transistor Q7 is off, transistor Q8 is on, the PNP drive transistor Q9 is on, and transistor 52 (also shown in FIG. 2) is on to charge the inductor 22 in FIG. 2. Once the capacitor C1 has charged to a certain level, the states of the transistors reverse, so that transistor 52 is turned off to discharge the inductor 22 and incrementally charge the output capacitor 30 in FIG. 2. When transistor Q7 turns on, the capacitor C1 is discharged, and the cycle repeats. The frequency of the oscillator 50 may be set by the value of the capacitor C1, and/or its series resistor, and/or the number of inverters.

The frequency of the oscillator 50 may be set to any value although, to keep the transistor 52 small, the frequency should be kept relatively high. The current handling capability of transistor 52 may be orders of magnitude less than the current handling capability of the power transistor 18.

Although the voltage applied to the capacitor C1 and inverter chain is controlled by the shunt regulator, the voltage to the drive transistor Q9 is not regulated by the shunt regulator to maximize the conductivity of the drive transistor Q9 and the switching transistor 52. This provides a very efficient switching circuit.

The chip 10 may instead be a voltage mode boost regulator, a non-PWM regulator, or any other type of regulator. The entire circuit of FIG. 2, except the output filter, may be integrated as a single integrated circuit.

Having described the invention in detail, those skilled in the art will appreciate that, given the present disclosure, modifications may be made to the invention without departing from the spirit of the inventive concept described herein. Therefore, it is not intended that the scope of the invention be limited to the specific embodiments illustrated and described.

What is claimed is:

1. A boost regulator comprising:
 a first boost regulator having a voltage input terminal for supplying power to components in the first boost regulator, the first boost regulator for controlling switching of a first transistor to supply a boosted voltage at an output node, the first boost regulator requiring at least a first voltage level at the voltage input terminal to operate properly;
 an inductor coupled at one end to a power supply voltage and at a second end to a first node, the first node being coupled to a first terminal of the first transistor, wherein switching of the first transistor charges and discharges the inductor to control a voltage level at the output node;
 a pre-boost circuit comprising:
  an oscillator powered from the power supply voltage when the power supply voltage is less than the first voltage level required to operate the first boost regulator;
  a second transistor connected to the oscillator, the oscillator switching the second transistor when the power supply voltage is less than the first voltage level, the second transistor being coupled to the first node, wherein switching of the second transistor charges and discharges the inductor to ramp up the output voltage at the output node to be greater than the power supply voltage;
  a first connection for feeding a boosted voltage at the output node to the voltage input terminal of the first boost regulator, whereby the boosted voltage causes the first boost regulator to be operational after the voltage at the voltage input terminal is at least the first voltage level; and
  a detection circuit for disabling the pre-boost circuit after the first boost regulator has become operational and begins switching the first transistor.

2. The regulator of claim 1 wherein the first connection comprises a low dropout (LDO) regulator connected between the voltage input terminal of the first boost regulator and the output node.

3. The regulator of claim 1 further comprising an enable terminal of the first boost regulator, wherein the voltage input terminal is connected to the enable terminal.

4. The regulator of claim 1 wherein the second transistor is a bipolar transistor connected between the first node and ground.

5. The regulator of claim 1 further comprising a filter circuit connected between the first node and the output node.

6. The regular of claim 1 wherein the first transistor and the second transistor are connected between the first node and ground.

7. The regulator of claim 1 further comprising a sense resistor connected to the second transistor for detecting a current flowing through the second transistor.

8. The regulator of claim 1 wherein the first boost regulator is a PWM regulator.

9. The regulator of claim 1 wherein the first boost regulator is a current mode PWM regulator.

10. The regulator of claim 1 wherein the detection circuit comprises a current detector for detecting that a current through the first transistor is above a threshold current and, in response, disabling the pre-boost circuit.

11. The regulator of claim 10 wherein the current detector comprises a comparator that compares a voltage corresponding to a current level to a threshold voltage, wherein tripping of the comparator disables the oscillator.

12. The regulator of claim 1 wherein the pre-boost circuit is operational with a power supply voltage of 1.5 volts, and the first boost regulator requires a voltage greater than 1.5 volts applied to its voltage input terminal to be operational.

13. The regulator of claim 1 wherein the pre-boost circuit is operational with a power supply voltage of 1.5 volts.

14. The regulator of claim 13 wherein the power supply voltage is from a single 1.5 volt battery.

15. The regulator of claim 1 wherein the oscillator comprises:
   a shunt regulator connected to the power supply voltage;
   an inverter chain;
   a capacitor couple to an input of the inverter chain, the shunt regulator controlling voltage to the capacitor and inverter chain;
   a switch selectively coupling the power supply voltage to the shunt regulator, the switch uncoupling the power supply voltage from the shunt regulator after the first boost regulator have become operational; and
   a driver receiving the power supply voltage, the power supply voltage to the driver not being regulated by the shunt regulator, an output of the driver being coupled to a control terminal of the second transistor.

16. A method performed by a boost regulator comprising:
   controlling switching of a first transistor by a first boost regulator to supply a boosted power supply voltage at an output node when the first boost regulator has at least a first voltage level applied to its voltage input terminal, the first boost regulator being non-operational when a voltage of less than the first voltage level is applied to its voltage input terminal;
   wherein switching of the first transistor charges and discharges an inductor connected at one end to a power supply voltage and at a second end to a first node, the first node being coupled to a first terminal of the first transistor;
   switching a second transistor in a pre-boost circuit by an oscillator powered from the power supply voltage when the power supply voltage is less than the first voltage level required to operate the first boost regulator, the second transistor being coupled to the first node, wherein switching of the second transistor charges and discharges the inductor to ramp up an output voltage at the output node to be greater than the power supply voltage;
   feeding a boosted voltage at the output node to the voltage input terminal of the first boost regulator, whereby the boosted voltage causes the first boost regulator to be operational after the voltage at the voltage input terminal is at least the first voltage level; and
   disabling the pre-boost circuit after the first boost regulator has become operational and begins switching the first transistor.

17. The method of claim 16 wherein the feeding the boosted voltage to the voltage input terminal comprises regulating the voltage to the voltage input terminal by a low dropout (LDO) regulator connected between the voltage input terminal of the first boost regulator and the output node.

18. The method of claim 16 wherein the first transistor and the second transistor are connected between the first node and ground.

19. The method of claim 16 further comprising detecting a current flowing through the first transistor by sensing a voltage across a sense resistor connected to the first transistor.

20. The method of claim 16 wherein the first boost regulator is a PWM regulator.

21. The method of claim 16 wherein the first boost regulator is a current mode PWM regulator.

22. The method of claim 16 wherein disabling the pre-boost circuit comprises detecting that a current through the first transistor is above a threshold current and, in response, disabling the pre-boost circuit.

23. The method of claim 16 wherein the pre-boost circuit is operational with a power supply voltage of 1.5 volts, and the first boost regulator requires a voltage greater than 1.5 volts applied to its voltage input terminal to be operational.

24. The method of claim 16 wherein the pre-boost circuit is operational with a power supply voltage of 1.5 volts.

* * * * *